US011545888B2

(12) United States Patent
Yang et al.

(10) Patent No.: US 11,545,888 B2
(45) Date of Patent: Jan. 3, 2023

(54) METHOD FOR MANAGING SWITCHING OF A FREQUENCY-CONTROLLED SWITCH ARM

(71) Applicant: Valeo Siemens eAutomotive France SAS, Cergy (FR)

(72) Inventors: Gang Yang, Courbevoie (FR); Huan Zhou, Houilles (FR); Sébastien Lecointre, Levallois-Perret (FR)

(73) Assignee: VALEO SIEMENS EAUTOMOTIVE FRANCE SAS, Cergy (FR)

( * ) Notice: Subject to any disclaimer, the term of this patent is extended or adjusted under 35 U.S.C. 154(b) by 88 days.

(21) Appl. No.: 17/260,003

(22) PCT Filed: Jul. 12, 2019

(86) PCT No.: PCT/EP2019/068920
§ 371 (c)(1),
(2) Date: Jan. 13, 2021

(87) PCT Pub. No.: WO2020/016140
PCT Pub. Date: Jan. 23, 2020

(65) Prior Publication Data
US 2021/0273569 A1 Sep. 2, 2021

(30) Foreign Application Priority Data
Jul. 17, 2018 (FR) ........................................ 1856597

(51) Int. Cl.
*H02M 3/335* (2006.01)
*H02M 1/38* (2007.01)
(Continued)

(52) U.S. Cl.
CPC ........... *H02M 1/38* (2013.01); *H02M 1/0058* (2021.05); *H02M 3/01* (2021.05);
(Continued)

(58) Field of Classification Search
CPC .... H02M 3/01; H02M 3/335; H02M 3/33569; H02M 3/33573; H02M 1/0058; H02M 1/38; H02M 3/33571; H02M 7/4815
See application file for complete search history.

(56) References Cited

U.S. PATENT DOCUMENTS

2016/0087543 A1 3/2016 Jin et al.
2016/0248412 A1* 8/2016 Kadowaki ............... H02M 1/38

FOREIGN PATENT DOCUMENTS

DE 102014224752 A1 6/2016

OTHER PUBLICATIONS

International Search Report for PCT Serial No. PCT/EP2019/068920 dated Aug. 7, 2019.

* cited by examiner

*Primary Examiner* — Gary L Laxton
(74) *Attorney, Agent, or Firm* — McCormick, Paulding & Huber PLLC

(57) ABSTRACT

A method for controlling switching of an electrical system comprising having at least one frequency-controlled switch arm, includes the following steps: closing a first top or bottom switch, implementing a predetermined downtime and opening a second switch, for a period corresponding to the control frequency, and then: opening the first switch, comparing the voltage measured at the midpoint with a voltage threshold, determining a second instant t2 at which the voltage measured at the midpoint crosses the voltage threshold, closing the second switch at the second instant t2, calculating a downtime DT adjusted according to a formula which is a function of the control frequency Fsw, a first instant t1 and a second instant t2, the adjusted downtime being implemented as of the subsequent switching.

20 Claims, 4 Drawing Sheets

(51) Int. Cl.
 *H02M 1/00* (2006.01)
 *H02M 3/00* (2006.01)
 *H02M 7/48* (2007.01)
(52) U.S. Cl.
 CPC ... *H02M 3/33571* (2021.05); *H02M 3/33573* (2021.05); *H02M 7/4815* (2021.05)

METHOD FOR MANAGING SWITCHING OF A FREQUENCY-CONTROLLED SWITCH ARM

CROSS-REFERENCE TO RELATED APPLICATIONS

This application is a National Stage application of International Patent Application No. PCT/EP2019/068920, filed on Jul. 12, 2019, which claims priority to French Patent Application No. 1856597 filed on Jul. 17, 2018, each of which is hereby incorporated by reference in its entirety.

TECHNICAL FIELD

Generally, the invention relates to the field of switch arms, such as H bridges, and more precisely that of frequency-controlled switch arms, in particular to control an energy circulating in a DC/DC voltage converter circuit, such as a resonant circuit.

In this context, the present invention relates to a method for switching a switch arm, such as an H bridge or a half-H bridge, optimized in that the deadtime observed during each switching has an adjusted duration at each switching command.

BACKGROUND

H bridges or half-H bridges are circuits that make it possible to control the polarity at the terminals of a load. An H bridge comprises four switching elements (a half-H bridge comprises two of them) of which the switchings are controlled for the purpose of controlling this polarity.

Typically, an H bridge or a half-H bridge can control an energy for the rotation of a rotating electric machine or control an energy circulating in a resonant circuit of the LLC type for example.

In reference to FIG. 1, as is known, an H bridge, like a half-H bridge, comprises a top branch and a bottom branch. A top branch of a half-H bridge connects a terminal of the circuit controlled by the H bridge to a top terminal of the H bridge, via a top switch Q1, the top terminal of the H bridge being connected to a top terminal of a power supply, said top switch Q1 being typically controlled by a pulse-width modulation. Reciprocally, a bottom branch of a half-H bridge connects a terminal of the circuit controlled by the H bridge to a bottom terminal of the H bridge, via a bottom switch Q2, the bottom terminal of the H bridge being connected to the ground, said bottom switch Q2 being typically controlled by a pulse-width modulation. The H bridge is supplied by a voltage Vin between the ground and the top terminal of the H bridge to deliver as output of the system an output voltage Vout.

As is also known, the "cross-conduction" phenomena, as it is known by those skilled in the art, meaning that the top and bottom branches of an H bridge or of a half-H bridge are simultaneously on, are to be prohibited.

For this purpose, it is known to control the switches in phase opposition.

Moreover, any switching command of a half-H bridge is the object of a deadtime during which the top and bottom switching elements are both open. The objective is in particular that the switch of which the opening is controlled is indeed open before controlling the closing of the other switch in order to ensure that there is no "cross-conduction".

On the other hand, as is known, still in reference to FIG. 1, half-H bridges preferably comprise switching elements Q1, Q2 allowing for a soft switching, i.e. without loss, or ZVS for "zero voltage switching". Then, said switching elements Q1, Q2 are comprised of a switch with, in parallel, a capacitor Czvs referred to as soft switching. The charging and the discharging of these capacitors Czvs is controlled in such a way as to allow for a soft switching of the half-H bridge. In other terms, the full charging or the full discharging of these soft switching capacitors Czvs is necessary to allow for the closing of a switch with a zero or quasi-zero voltage at its terminals.

As is known, upon reception of a switching command, a deadtime is imposed on the top and bottom switching elements Q1, Q2 during which said switching elements are all forced to the open state. The deadtime makes it possible to charge or discharge the capacitors Czvs in such a way that a soft switching is possible.

In order for the switching of the switch arm to be fast, said deadtime must be as short as possible.

In the context, as in FIG. 1, of a half-H bridge, with soft switching, frequency controlled in order to control an energy circulating in a DC/DC voltage converter circuit, such as a resonant circuit, the number of parameters to take into consideration to determine the ideal duration of the deadtime is substantial.

For a circuit topology of the type of that of the circuit shown in FIG. 1, said duration of deadtime depends on many parameters and electrical magnitudes, such as the switching frequency, the voltage Vin delivered at the input of the half-H bridge or the voltage Vout at the output of the resonant circuit, etc.

In the state of the art, deadtime often has a fixed duration, that corresponds to a value that always satisfies the conditions of a soft switching regardless of the values of the parameters hereinabove, and regardless of the switching frequency. Consequently, such a deadtime is excessively long in many cases.

It is also known to vary the duration of the deadtime according to the switching frequency, using predetermined laboratory deadtime values. The deadtime durations are then memorized and applied according to the switching frequency.

There is therefore a need for a method for switching a switch arm, such as a half-H bridge, that allows for the adjusting in real time of the duration of the deadtime implemented during each switching.

For this purpose, the present invention proposes measuring the voltage at the midpoint of the half-H bridge and comparing this voltage with a voltage threshold making it possible to calculate, at each switching, a duration of time that is adjusted in an optimum manner.

SUMMARY

More precisely, the invention relates to a method for controlling switching of an electrical system comprising at least one frequency-controlled switch arm and configured to be connected to a DC/DC voltage converter circuit, said arm having a top branch comprising a top switch, connected to a top terminal of the arm and a bottom branch comprising a bottom switch, connected to a bottom terminal of the arm, and a midpoint corresponding to a connection point between the top branch, the bottom branch and the DC/DC voltage converter circuit, said method comprising the following steps, upon reception of a switching command at a first instant t1:

opening a second switch,
implementing a predetermined deadtime, closing a first switch for a period corresponding to the control frequency of said at least one switch arm, then, at the end of the period:
opening the first switch,
measuring a voltage at the midpoint,
comparing the voltage measured at the midpoint with a voltage threshold,
determining a second instant t2 at which the voltage measured at the midpoint crosses the voltage threshold,
closing the second switch at said second instant t2,
calculating a deadtime duration DT adjusted according to the following formula:

$$DT = \left( \frac{t2 - t1 - \frac{1}{2 \cdot F_{SW}}}{2} \right)$$

where $F_{SW}$ is the control frequency of said at least one switch arm,
said adjusted deadtime duration being implemented during the reception of a following switching command of said at least one switch arm.

In particular, the electrical system comprises at least one capacitor in parallel with the bottom switch for a soft switching at the terminals of the switching elements of the electrical system. In particular, each switch has a capacitor in parallel with the switch for a soft switching at the terminals of the switching elements of the electrical system.

The method according to the invention makes it possible to adjust at each switching the duration of the deadtime used during the following switching in a switch arm such as an H bridge, frequency controlled, regardless of the switching frequency or the input voltage.

Thanks to the present invention, soft switchings are carried out with reduced deadtime. The present invention is particularly suited in the case of an electrical system wherein the switch arm controls the energy circulating in a resonant circuit because the duration of the deadtime is substantially affected by the switching frequency. In practice, said switching frequency can conventionally vary in a ratio from 1 to 3, in particular between 80 kHz and 270 kHz, as well as the duration of the deadtime, which can vary for example between 400 ns and 1100 ns.

Advantageously, the method comprises the reiteration of all of the steps cyclically.

According to an embodiment, the method moreover comprises the following prior steps:
predefining a maximum deadtime duration and a minimum deadtime duration,
initializing a deadtime duration to an initial value comprised between the maximum deadtime duration and the minimum deadtime duration,
the duration of the deadtime used implemented during the reception of a following switching command of said at least one switch arm being equal to the maximum deadtime duration if the duration of the adjusted calculated deadtime is greater than said maximum deadtime duration, and
the duration of the deadtime used implemented during the reception of a following switching command of said at least one switch arm being equal to the minimum deadtime duration if the duration of the adjusted calculated deadtime is less than the minimum deadtime duration.

According to an embodiment, the voltage threshold is a high voltage threshold greater than or equal to 90% of an input voltage between the top terminal and the bottom terminal of said at least one switch arm, and wherein the determining of the second instant at which the voltage measured at the midpoint crosses the voltage threshold is carried out on the rising edge of said voltage at the midpoint.

According to an embodiment, the voltage threshold is a low voltage threshold less than or equal to 10% of an input voltage between the top terminal and the bottom terminal of said at least one switch arm, and wherein the determining of the second instant at which the voltage measured at the midpoint crosses the voltage threshold is carried out on the falling edge of said voltage at the midpoint.

According to an embodiment, the method according to the invention is a method for controlling switching of a circuit comprising two switch arms forming a frequency-controlled H bridge.

According to an embodiment, the method according to the invention further comprises a step of inhibiting the comparison of the voltage measured at the midpoint with a high or low voltage threshold at least during a predetermined period after the end of the deadtime.

The present invention also relates to an electrical system comprising at least one frequency-controlled switch arm and configured to control a DC/DC voltage converter circuit, the switch arm having a top branch comprising a top switch, connected to a top terminal of the arm and a bottom branch comprising a bottom switch, connected to a bottom terminal of the arm, said switch arm moreover having a midpoint that corresponds to a connection point between the top branch, the bottom branch and the DC/DC voltage converter circuit, said system moreover comprising a control unit comprising:
a voltage measuring circuit at the midpoint,
a comparison circuit configured to compare the voltage measured at the midpoint with a high voltage threshold in case of switching that tends to turn on the top branch and with a low voltage threshold in case of switching that tends to turn on the bottom branch,
said control unit being configured to implement the method described briefly hereinabove.

According to an embodiment, the electrical system according to the invention forms a DC/DC voltage converter.

According to an embodiment, the electrical system according to the invention comprises an inhibition circuit configured to inhibit the comparison circuit during at least one predetermined duration after the end of the deadtime.

According to an embodiment, the control unit comprises two monostable pulse-width modulation generators delivering switching commands respectively to the top branch and to the bottom branch of the switch arm.

According to an embodiment, the electrical system comprises a resonant circuit connected to the midpoint of the switch arm in such a way that the switch arm controls the energy circulating in said resonant circuit.

The invention also relates to an electric charger system of a battery, in particular of an electric or hybrid automobile vehicle, comprising an electrical system such as briefly described hereinabove.

BRIEF DESCRIPTION OF THE FIGURES

The invention will be better understood when reading the following description, given solely as an example, and in reference to the accompanying drawings that show.

DETAILED DESCRIPTION

Recall that the present invention is described hereinafter using different non-limiting embodiments and is able to be implemented in alternatives within the scope of those skilled in the art, also the subject of the present invention.

Figure 1:
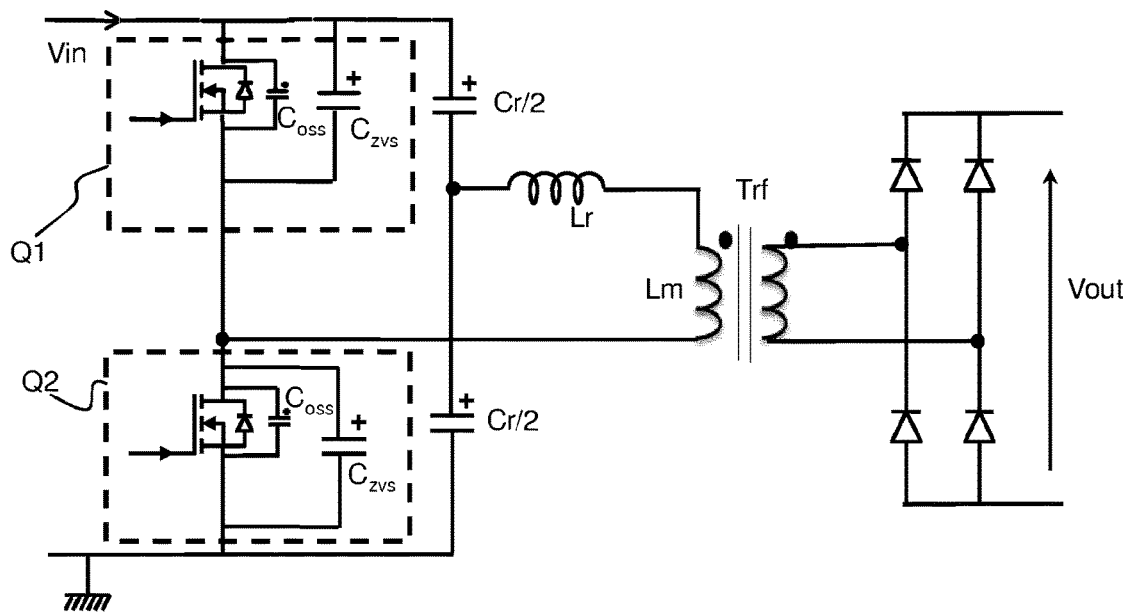
FIG. 1, the diagram of a half-H bridge controlling the energy circulating in a resonant circuit LLC, according to the prior art, FIG. 2, the diagram representing the method for automatically determining the end of a deadtime during a switching in a half-H bridge, according to the invention, FIG. 3, the diagram showing, in relation with FIG. 2, the correlation between the change in the voltage at the midpoint and the switching commands of the half-H bridge, with a low voltage threshold, FIG. 4, the diagram showing, in relation with FIG. 2, the correlation between the change in the voltage at the midpoint and the switching commands of the half-H bridge, with a high voltage threshold, FIG. 5, the diagram of an example of an electrical system wherein the invention is implemented, FIG. 6, the block diagram of an example of a control unit allowing for the implementation of the invention.
Figure 2:
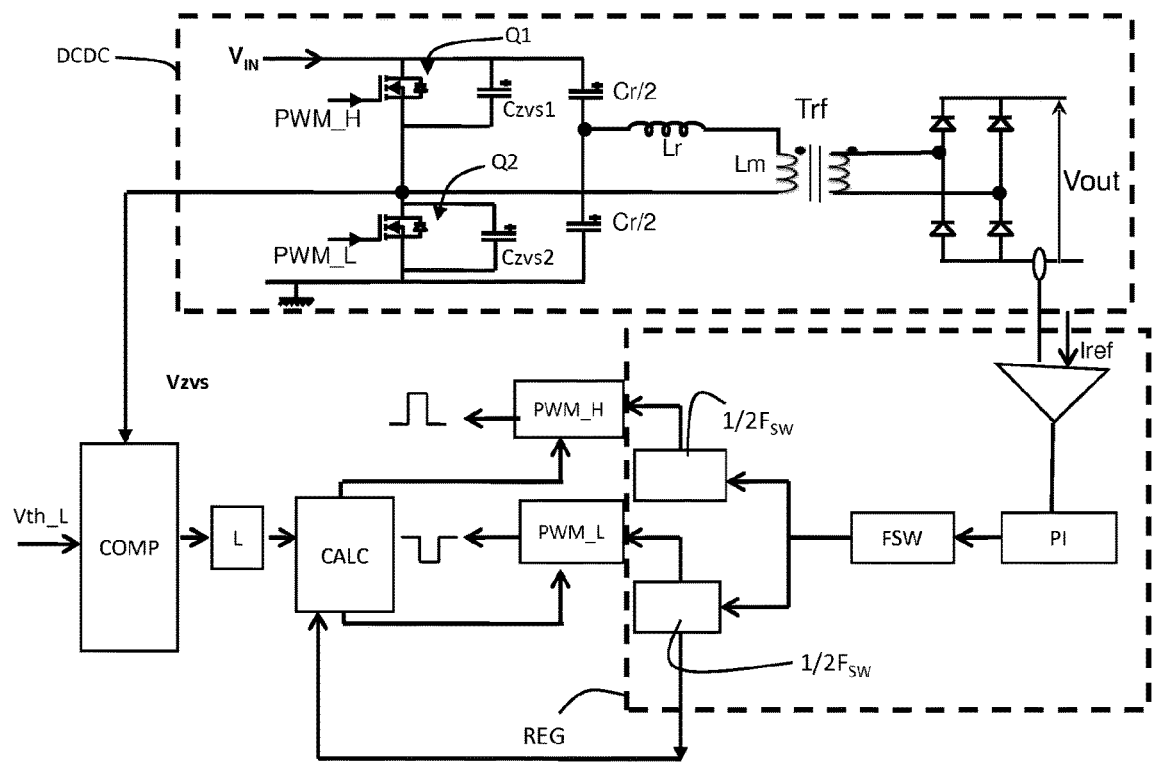

FIG. 2 shows a diagram showing the operation of an example of the method and of an example of an electrical system according to the invention.

The electrical system of FIG. 2 comprises a switch arm, forming a half-H bridge, connected to a DC/DC voltage converter circuit DCDC. Said half-H bridge has a top branch comprising a top switch Q1, connected to a top terminal of the half-H bridge, and a bottom branch comprising a bottom switch Q2, connected to a bottom terminal of the arm. A midpoint of the half-H bridge corresponds to a connection point between the top branch, the bottom branch and the DC/DC voltage converter circuit DCDC.

In other words, the half-H bridge, designated as H in FIG. 2, controls the energy circulating in the DC/DC voltage converter circuit, designated as DCDC in FIG. 2, by means of switchings of the top and bottom switching elements Q1, Q2.

According to the embodiment of FIG. 2, the DC/DC voltage converter circuit DCDC is galvanically isolated and comprises a resonant circuit LLC at the primary and a rectifier RD at the secondary, with, between the primary and the secondary, a transformer Trf. In the embodiment shown in FIG. 2, moreover, the transformer Trf includes the magnetizing inductance of the primary.

A voltage Vin is delivered as input of the DC/DC voltage converter circuit DCDC and the latter delivers as output an output voltage Vout.

In the half-H bridge, the switchings of the top and bottom switching elements Q1, Q2 are frequency controlled, in particular by means of two monostable pulse-width modulation control units PWM_L, PWM_H phase opposition controlled. A pulse-width modulation control unit PWM_H makes it possible to control the top switch Q1 and the other pulse-width modulation control unit PWM_L makes it possible to control the bottom switch Q2.

The switching frequency of the control units PWM_L, PWM_H is generated in a unit $F_{SW}$.

According to the embodiment of FIG. 2, the switching elements Q1, Q2 moreover each have a soft switching capacitor Czvs1, Czvs2 connected in parallel.

As was described hereinabove, the ideal duration of the deadtime corresponds to the minimum time required to ensure, during a switching of the switching elements Q1, Q2, that the switching to the closed state of a switch is done at a zero or quasi-zero voltage.

As mentioned hereinabove, the ideal duration of the deadtime depends on many parameters and electrical magnitudes. For example, in the context of the electrical system shown in FIG. 2, the ideal duration of the time depends on the value of the soft switching capacitors Czvs1, Czvs2, on the value of the parasite capacitors of the switches Q1, Q2, on the input voltage Vin, on the switching frequency $F_{SW}$, on the value of the magnetizing inductance Lm, on the output voltage Vout or on the transformation ratio of the transformer Trf.

The great variability in the ideal duration of the deadtime makes it extremely complex to implement a solution according to which the duration of the deadtime would be determined before each switching.

According to the present invention, the duration of the deadtime is however adjusted at each switching command, according to the switching frequency and the measured value of the voltage at the midpoint corresponding to the connection point between the top branch, the bottom branch and the DC/DC voltage converter circuit DCDC. The calculation module CALC memorizes said adjusted duration of the time in a memory of the system in order to be taken into account during the following switching command.

The value of the voltage at the midpoint is theoretically equal to 0 when the bottom switch is closed and the top switch open and, reciprocally, the voltage at the midpoint is theoretically equal to Vin when the top switch is closed and the bottom switch open. In other words, during a switching of the half-H bridge, the voltage at the midpoint moves towards 0 or towards Vin according to whether it is, respectively, the bottom switch that closes and the top switch that opens, or the reverse.

According to the invention, during the reception of a switching command, the beginning of a deadtime is provided during which the top and bottom switching elements Q1, Q2 are controlled in the open state. Said deadtime has a duration.

Preferably, a maximum duration of the deadtime and a minimum duration of the deadtime are predefined. Initially, the duration of the deadtime is arbitrarily chosen between these maximum and minimum values.

Then, during the operation of the electrical system, the duration of the deadtime DT is adjusted at each switching. More precisely, upon reception of a switching command, the duration of the deadtime DT applied is that which is known at that instant. The method according to the invention makes it possible, in the framework of said switching, to calculate an adjusted deadtime duration DT which is used during the following switching; at each cycle, an adjusted duration of the deadtime DT is then calculated and used for the following switching.

For this purpose, a voltage threshold is defined. According to an embodiment, a single voltage threshold is defined. The advantage associated with the defining of a single voltage threshold resides in the induced simplification of the control unit allowing for the implementation of the method according to the invention. Such a control unit is shown, according to an embodiment, in FIG. 6, described hereinafter.

The voltage threshold can be a high voltage threshold or a low voltage threshold. If it is a high voltage threshold, said voltage threshold is for example greater than or equal to 90% of the input voltage Vin. If it is a low voltage threshold Vth_L, said voltage threshold is for example less than or equal to 10% of the input voltage Vin. For example, with Vin=400 V, the voltage threshold can be equal to 390 V or to 10V.

To calculate the adjusted duration of the deadtime DT during a switching, the method according to the invention provides for determining a first instant t1, at which the switching command is received. The method further comprises the determining of a second instant t2, subsequent to the closing of the switch Q1, Q2 having switched to the closed state, at which the voltage Vzvs measured at the midpoint becomes higher than the voltage threshold Vth_L on the rising edge, or, respectively, at which the voltage Vzvs measured at the midpoint becomes lower than the voltage threshold Vth_L on the falling edge.

Thus, at a first instant t1, a switching command of the switch arm is received, generating the opening the switch of which the opening is controlled and the beginning of a deadtime that has a duration that corresponds to the deadtime duration known at this instant t1. At the end of the deadtime, the switch of which the closing is controlled is effectively closed, for a period Ton corresponding to the control frequency $F_{SW}$.

The switching frequency $F_{SW}$ used for the control of the switch arm is in particular known or measured, for example via a proportional-integral control circuit.

Then, an adjusted deadtime duration DT is calculated according to the formula:

$$DT = \left( \frac{t2 - t1 - \frac{1}{2 \cdot F_{SW}}}{2} \right)$$

According to an embodiment, it is provided, for safety reasons, to limit the duration of the adjusted calculated deadtime DT. Thus, if the duration of the adjusted calculated deadtime DT is greater than the predefined maximum deadtime duration DT_max, then the deadtime duration DT used during the following switching is equal to said maximum duration of the deadtime DT_max. Reciprocally, if the duration of the adjusted calculated deadtime DT is less than the predefined minimum duration of the deadtime DT_min, then the duration of the deadtime DT used during the following switching is equal to said minimum duration of the deadtime DT_min.

In other words, the adjusted duration of the deadtime DT is calculated according to the formula:

$$DT = \min\left( \max\left( \frac{t2 - t1 - \frac{1}{2 \cdot F_{SW}}}{2}; DT\_min \right); DT\_max \right)$$

At each switching, the duration of the deadtime DT is consequently updated to the value of said adjusted calculated duration of the deadtime DT, preferably provided that it is not greater than the maximum duration of the deadtime or less than the minimum duration of the deadtime, with the purpose of being used for the following switching. When the duration, preferably limited, of the adjusted deadtime DT has elapsed: on the rising edge, the closing of the top switch Q1 is carried out; reciprocally, on the falling edge, the closing of the bottom switch Q2 is carried out.

In other words, still in reference to FIG. 2, the method comprises the measuring of the voltage Vzvs at the midpoint corresponding to the connection point between the top branch, the bottom branch and the DC/DC voltage converter circuit DCDC. Upon reception of a switching command of the half-H bridge, the deadtime DT starts and has, during the first switching of the switch arm, a duration equal to a predefined initial duration. At each switching, an adjusted duration of the deadtime DT is calculated according to the formula hereinabove. Said adjusted calculated duration of the deadtime DT, preferably limited between a minimum duration of the deadtime and a maximum duration of the deadtime, is used for the following switching.

During the duration of the deadtime, the pulse-width modulation control units PWM_H and PWM_L both control the top and bottom switching elements Q1, Q2 at the open state.

According to an embodiment, an inhibition circuit L can be provided that allows for the inhibition of the comparison of the voltage Vzvs measured at the midpoint with the voltage threshold during a predetermined duration. Said predetermined durations depends on the switching frequency of the resonant circuit. It can for example be of a magnitude of 1s for a switching frequency of 100 kHz. The presence of this inhibition circuit, also designated as "latch circuit", is optional. The inhibition circuit L makes it possible to prevent the effects of an oscillation of the voltage Vzvs at the midpoint during the reaching of the setpoint, i.e. Vin or 0, making it possible to prevent possible current returns that would disturb the operation of the electrical system.

The duration of the inhibition of the command, imposed by the inhibition circuit, is typically of a magnitude of $\frac{1}{10}$ to $\frac{1}{5}$ of the period corresponding to the switching frequency of the half-H bridge. In particular, the inhibition starts at the end of the deadtime.

According to an embodiment, the inhibition circuit is carried out by a microprocessor.

The regulation circuit REG diagrammatically shown in FIG. 2 can comprise a proportional-integral control circuit PI to provide the pulse-width modulation control units PWM_L, PWM_H with the switching frequency $F_{SW}$ using the comparison between the reference current Iref and the measured current at the output of the DC/DC voltage converter circuit DCDC. In particular using said switching frequency $F_{SW}$ coming from the regulation circuit REG, the pulse-width modulation control units PWM_H, PWM_L control the state of the top and bottom switching elements Q1, 02. The commands coming from the inhibition circuit can inhibit this operation according to the voltage Vzvs at the midpoint FIG. 3 shows, in an embodiment according to which the chosen voltage threshold, Vth_L, is a low threshold, the correlation between the change in the voltage Vzvs at the midpoint and the switching commands of the half-H bridge, said commands being in particular coming from pulse-width modulation control units coming from respective signals PWM_H, PWM_L.

Figure 3:
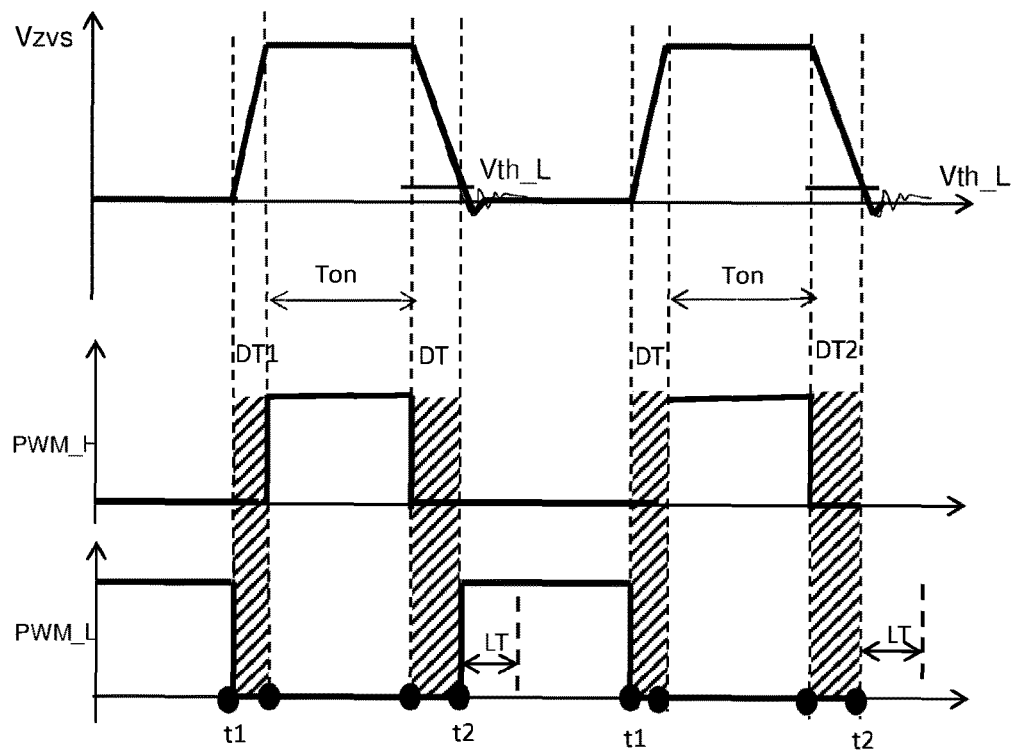

The diagrams of FIG. 3 show that, on the rising edge, the switching command switches to the high state for the pulse-width modulation control unit PWM_H and to the low state for the pulse-width modulation control unit PWM_L when the duration of the time DT1, in particular calculated during the preceding switching, is elapsed since the reception of the switching command at the instant t1. The switching corresponds to the end of the deadtime and to the beginning of the inhibition of the command by the inhibition circuit L, during the duration LT.

On the falling edge, the switching command switches to the high state for the pulse-width modulation control unit PWM_L and to the high state for the pulse-width modulation control unit PWM_H when the voltage Vzvs at the midpoint becomes less than the voltage threshold Vth_L, at the instant t2. The switching corresponds to the end of the adjusted deadtime DT and to the beginning of the inhibition of the command by the inhibition circuit L, during the duration TL.

The adjusted duration of the deadtime DT is then calculated in accordance with the formula described hereinabove, memorized, and used during the following switching, according to t1, t2 and the period Ton that corresponds to the switching frequency $F_{SW}$. During the following switching, on the rising edge, the deadtime duration DT calculated during the preceding switching is used. On the falling edge, the duration of the deadtime DT2 is adjusted during the crossing of the voltage threshold Vth_L. The new time duration DT2 is memorized and used for the rising edge during the following switching.

Note that this offset between the calculation of an adjusted deadtime duration DT and its use in the following switching is perfectly acceptable in that, in a frequency-controlled switch arm, the control frequency varies very little from one switching to another.

Figure 4:
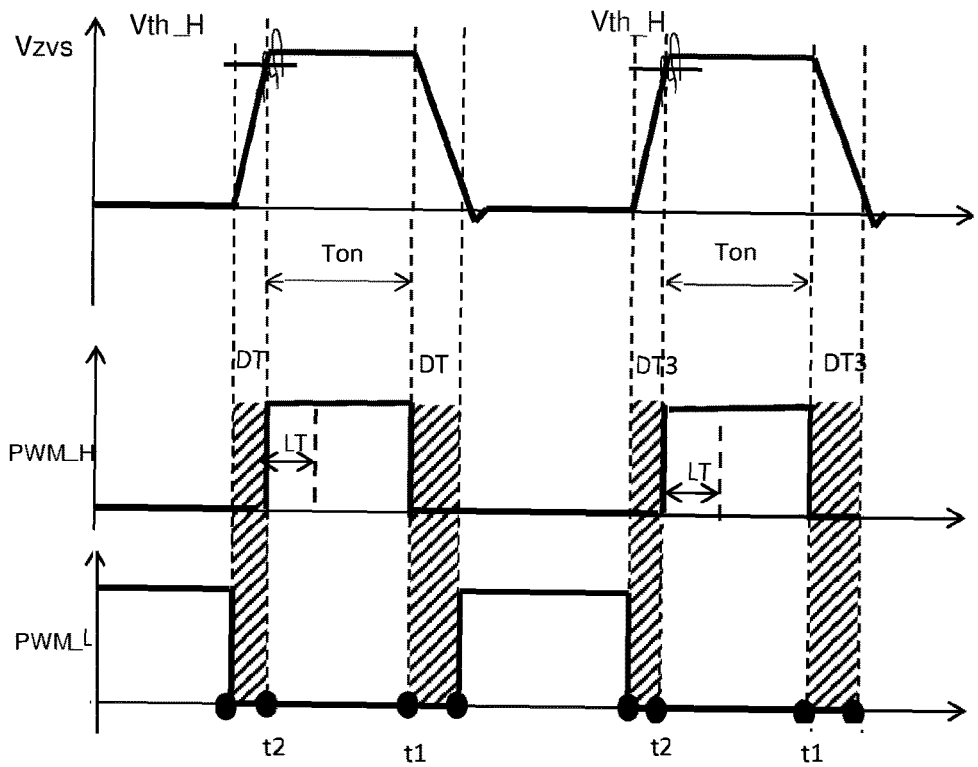

In the example described in reference to FIG. 3, the voltage threshold Vth_L used is a low threshold. If a high voltage threshold Vth_H is chosen, as in FIG. 4, the principle remains the same. Only, it is on the rising edge that the adjusted deadtime duration DT is calculated, the latter being calculated during the crossing of the high voltage threshold Vth_H, memorized and used during the following switching. During the following rising edge, a new calculation of the adjusted time duration DT3 is carried out, said new adjusted duration being memorized and used during the following switching. At each time, the switching corresponds to the end of the deadtime and to the beginning of the inhibiting of the command by the inhibition circuit L, during the duration TL.

Figure 5:
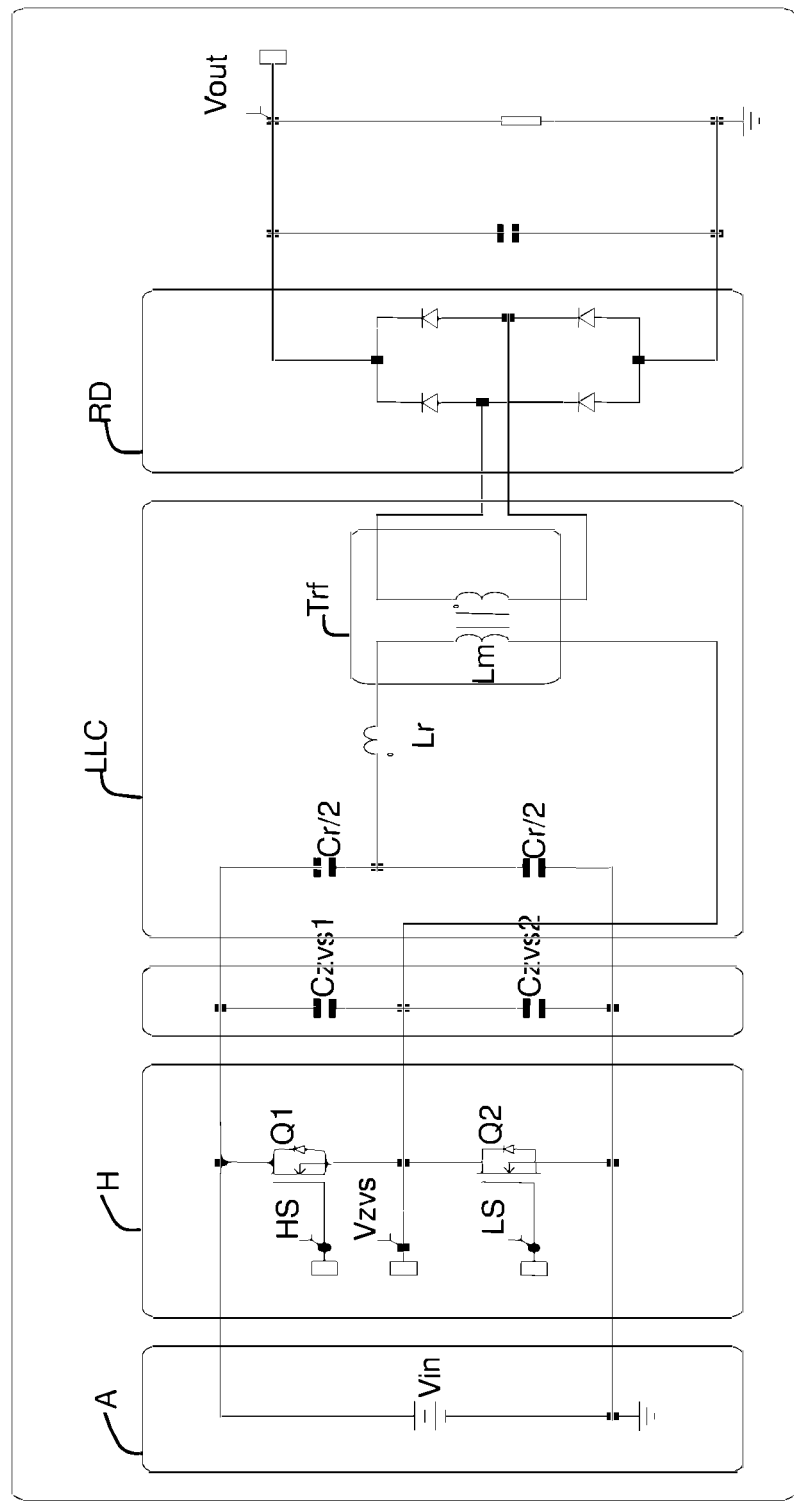

FIG. 5 shows an example of an electrical system with as input a voltage source A delivering a voltage Vin between a top input terminal and a bottom input terminal of a half-H bridge, referenced as H in FIG. 5, said half-H bridge controlling a DC/DC voltage converter circuit comprising a resonant circuit LLC and a rectifier RD, said DC/DC voltage converter delivering as output of the electrical system a voltage Vout.

The resonant circuit LLC is isolated. In the primary, it has resonance capacitors Cr/2 and a resonance inductance Lr, a magnetizing inductance of the transformer Trf plays the role of a second resonance inductance. In the secondary, the rectifier RD comprises diodes, but it could comprise switches. The transformer Trf is connected between the primary and the secondary.

The resonance inductance Lr and the primary of the transformer Trf are in series in a branch connected between the midpoint of the arm H and a midpoint of the capacitors Cr/2. The capacitors Cr/2 are themselves connected between their midpoint and respectively the top terminal and the bottom terminal of the electrical system. However, the resonant circuit could be different. For example, it could comprise a single resonance capacitor Cr in series with the resonance inductance Cr and the primary of the transformer Trf, the branch comprising them able to be connected between the midpoint of switches Q1, Q2 and the bottom terminal of the arm.

The voltage Vzvs is measured at the midpoint corresponding to a connection point between the top branch of the half-H bridge, its bottom branch and the DC/DC voltage converter circuit DCDC.

The half-H bridge comprises a top switch Q1, connected between the top terminal of said half-H bridge and the midpoint and a bottom switch Q2 connected between the bottom terminal of said half-H bridge and the midpoint. The top and bottom switching elements Q1, Q2 have, connected to the respective terminals, in parallel, a soft switching capacitor Czvs1, Czvs2.

Figure 6:
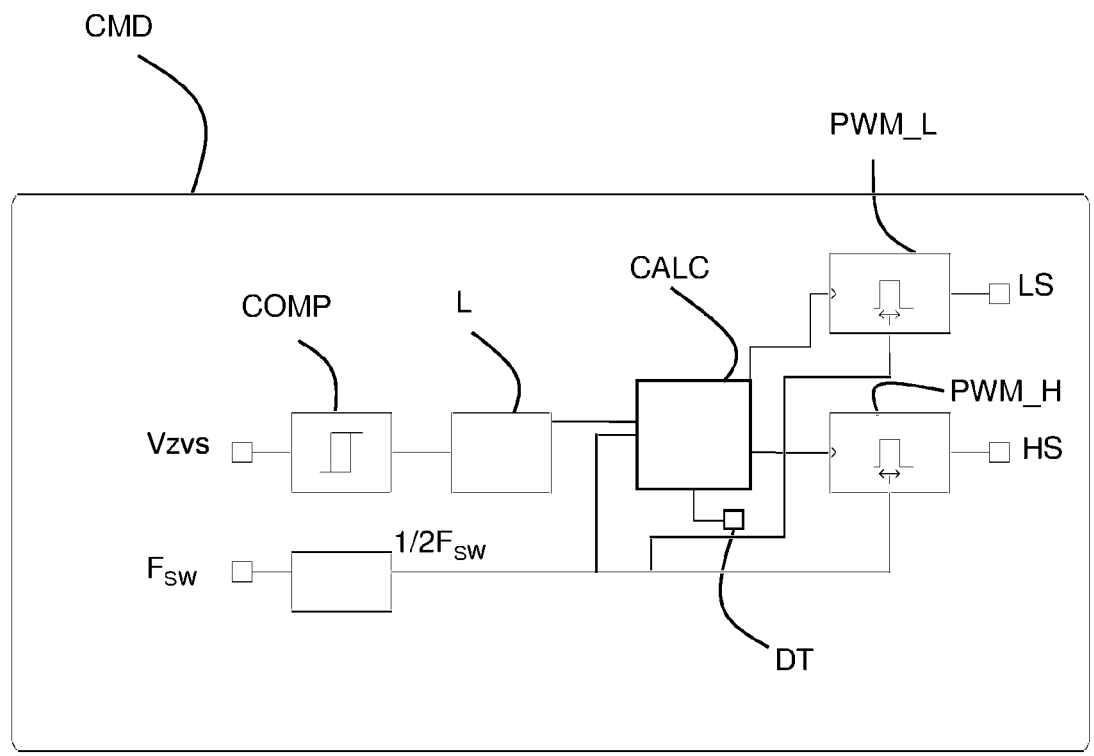

Said top and bottom switching elements, Q1, Q2 are controlled according to the outputs HS, LS of a control unit shown in FIG. 6.

The control unit CMD shown in FIG. 6 comprises a voltage measuring circuit Vzvs at the midpoint and a regulating circuit delivering the switching frequency $F_{SW}$. At each reception of a switching command at a first instant t1, the adjusted deadtime duration is recalculated and implemented at the following switching.

The comparison circuit COMP compares the voltage Vzvs measured at the midpoint with the voltage threshold Vth_L in order to determine the second instant t2.

The inhibition circuit L inhibits the control during a predetermined duration, typically comprised between $\frac{1}{10}$ and $\frac{1}{5}$ of the period corresponding to the switching frequency $F_{SW}$.

The calculation module CALC determines, according to the formula described hereinabove, the value of the adjusted deadtime DT to be used during the following switching. The calculation module CALC memorizes said adjusted duration of the time DT in a memory of the system in order to be taken into account during the following switching command.

According to the switching frequency $F_{SW}$ and outputs of the comparison circuit COM and inhibition L, pulse-width modulation generators PWM_L, PWM_H deliver the commands LS, HS—high state or low state—respectively to the top switch Q1 and to the bottom switch Q2.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A method for controlling switching of an electrical system comprising at least one frequency-controlled switch arm and configured to be connected to a DC/DC voltage converter circuit, said arm having a top branch comprising a top switch, connected to a top terminal of the arm and a bottom branch comprising a bottom switch, connected to a bottom terminal of the arm, and a midpoint corresponding to a connection point between the top branch, the bottom branch and the DC/DC voltage converter circuit, said method comprising the following steps, upon reception of a switching command at a first instant t1:

opening a second switch,
implementing a predetermined deadtime,
closing a first switch for a period corresponding to a control frequency of said at least one switch arm; then, at the end of the period:
opening the first switch,
measuring a voltage at the midpoint,
comparing the voltage measured at the midpoint with a voltage threshold,
determining a second instant t2 at which the voltage measured at the midpoint crosses the voltage threshold,
closing the second switch at said second instant t2,
calculating an adjusted deadtime duration according to the following formula:

$$DT = \left(\frac{t2 - t1 - \frac{1}{2 \times F_{SW}}}{2}\right)$$

where $F_{sw}$ is the control frequency of said at least one switch arm, said adjusted deadtime duration being implemented during the reception of a following switching command of said at least one switch arm.

2. The method according to claim 1, comprising a cyclical reiteration of all the steps of said method.

3. The method according to claim 1, moreover comprising steps:

defining a maximum deadtime duration and a minimum deadtime duration, initializing a deadtime duration at an initial value comprised between the maximum deadtime duration and the minimum deadtime duration, a used duration of the deadtime implemented when receiving a next switching command of said at least one switch arm being equal to the maximum deadtime duration if an adjusted calculated deadtime duration is greater than said maximum deadtime duration, and the used duration of the deadtime implemented when receiving a next switching command of said at least one switch arm being equal to the minimum deadtime duration if the adjusted calculated deadtime duration is less than said minimum deadtime duration.

4. The method according to claim 1, wherein the voltage threshold is a high voltage threshold greater than or equal to 90% of an input voltage between the top terminal and the bottom terminal of said at least one switch arm, and wherein determining the second instant at which the voltage measured at the midpoint crosses the voltage threshold is carried out on the rising edge of said voltage at the midpoint.

5. The method according to claim 1, wherein the voltage threshold is a low voltage threshold less than or equal to 10% of an input voltage between the top terminal and the bottom terminal of said at least one switch arm, and wherein determining the second instant at which the voltage measured at the midpoint crosses the voltage threshold is carried out on the falling edge of said voltage at the midpoint.

6. The method according to claim 1, for controlling switching of the electrical system, the electrical system comprising two switch arms forming a frequency-controlled H bridge.

7. The method according to claim 1, further comprising a step of inhibiting the comparison of the voltage measured at the midpoint with the voltage threshold at least during a predetermined period after the end of the deadtime.

8. The electrical system comprising at least one frequency-controlled switch arm and configured to control a DC/DC voltage converter circuit, the switch arm having a top branch comprising a top switch, connected to a top terminal of the arm and a bottom branch comprising a bottom switch, connected to a bottom terminal of the arm, said switch arm having a midpoint that corresponds to a connection point between the top branch, the bottom branch and the DC/DC voltage converter circuit, said system moreover comprising a control unit comprising:

a voltage measuring circuit at the midpoint, a comparison circuit configured to compare the voltage measured at the midpoint with a voltage threshold, said control unit being configured to implement the method according to claim 1.

9. The system according to claim 8, comprising an inhibition circuit configured to inhibit the comparison circuit during at least one predetermined duration after the end of the deadtime.

10. The electrical system according to claim 8, comprising a resonant circuit connected to the midpoint of the switch arm in such a way that the switch arm controls the energy circulating in said resonant circuit.

11. The method according to claim 2, moreover comprising the following prior steps:

defining a maximum deadtime duration and a minimum deadtime duration, initializing a deadtime duration at an initial value comprised between the maximum deadtime duration and the minimum deadtime duration, a used duration of the deadtime implemented when receiving a next switching command of said at least one switch arm being equal to the maximum deadtime duration if the adjusted calculated deadtime duration is greater than said maximum deadtime duration, and the used duration of the deadtime implemented when receiving a next switching command of said at least one switch arm being equal to the minimum deadtime duration if the adjusted calculated deadtime duration is less than said minimum deadtime duration.

12. The method according to claim 2, wherein the voltage threshold is a high voltage threshold greater than or equal to 90% of an input voltage between the top terminal and the bottom terminal of said at least one switch arm, and wherein determining the second instant at which the voltage measured at the midpoint crosses the voltage threshold is carried out on a rising edge of said voltage at the midpoint.

13. The method according to claim 3, wherein the voltage threshold is a high voltage threshold greater than or equal to 90% of an input voltage between the top terminal and the bottom terminal of said at least one switch arm, and wherein determining the second instant at which the voltage measured at the midpoint crosses the voltage threshold is carried out on the rising edge of said voltage at the midpoint.

14. The method according to claim 2, wherein the voltage threshold is a low voltage threshold less than or equal to 10% of an input voltage between the top terminal and the bottom terminal of said at least one switch arm, and wherein determining the second instant at which the voltage measured at the midpoint crosses the voltage threshold is carried out on a falling edge of said voltage at the midpoint.

15. The method according to claim 3, wherein the voltage threshold is a low voltage threshold less than or equal to 10% of an input voltage between the top terminal and the bottom terminal of said at least one switch arm, and wherein determining the second instant at which the voltage measured at the midpoint crosses the voltage threshold is carried out on a falling edge of said voltage at the midpoint.

16. The method according to claim 2, for controlling switching of the electrical system, the electrical system comprising two switch arms forming a frequency-controlled H bridge.

17. The method according to claim 3, for controlling switching of the electrical system, the electrical system comprising two switch arms forming a frequency-controlled H bridge.

18. The method according to claim 4, for controlling switching of the electrical system, the electrical system comprising two switch arms forming a frequency-controlled H bridge.

19. The method according to claim 5, for controlling switching of the electrical system, the electrical system comprising two switch arms forming a frequency-controlled H bridge.

20. The method according to claim 2, further comprising a step of inhibiting the comparison of the voltage measured at the midpoint with the voltage threshold at least during a predetermined period after the end of the deadtime.

\* \* \* \* \*